(12) United States Patent
Nam et al.

(10) Patent No.: US 7,974,349 B2
(45) Date of Patent: Jul. 5, 2011

(54) OPTIMUM PERTURBATION APPARATUS AND METHOD IN A MULTI-ANTENNA MULTI-USER COMMUNICATION SYSTEM

(75) Inventors: Seung-Hoon Nam, Seoul (KR);
Myeon-Kyun Cho, Seongnam-si (KR);
Jong-Hyeuk Lee, Anyang-si (KR);
Joo-Hwan Chun, Deajeon (KR);
Eun-Yong Kim, Deajeon (KR)

(73) Assignees: Samsung Electronics Co., Ltd (KR);
Korea Advanced Institute of Science and Technology (KR)

( * ) Notice: Subject to any disclaimer, the term of this patent is extended or adjusted under 35 U.S.C. 154(b) by 1214 days.

(21) Appl. No.: 11/650,470

(22) Filed: Jan. 8, 2007

(65) Prior Publication Data
US 2010/0232531 A1    Sep. 16, 2010

(30) Foreign Application Priority Data
Jan. 6, 2006   (KR) .................. 10-2006-0001579

(51) Int. Cl.
*H04L 27/00* (2006.01)
(52) U.S. Cl. ...................................... 375/259; 375/285
(58) Field of Classification Search .................. 370/259, 370/344; 375/259, 267, 297, 299; 382/233, 382/248
See application file for complete search history.

(56) References Cited

U.S. PATENT DOCUMENTS
2003/0185310 A1* 10/2003 Ketchum et al. ............. 375/259
2003/0235255 A1* 12/2003 Ketchum et al. ............. 375/285

FOREIGN PATENT DOCUMENTS
KR    1020050013633    2/2005
* cited by examiner

*Primary Examiner* — David C. Payne
*Assistant Examiner* — Leon-Viet Q Nguyen
(74) *Attorney, Agent, or Firm* — The Farrell Law Firm, P.C.

(57) ABSTRACT

An optimum perturbation apparatus and method in a multi-antenna, multi-user communication system are provided. In the optimum perturbation method, upon receipt of modulation symbols, channel responses are decomposed into eigenvalues and eigenvectors by Single Value Decompositin (SVD) and a distortion value of the modulation symbols is estimated using the eigenvectors and the eigenvalues to minimize noise and interference power. The modulation symbols are precoded by combining the modulation symbols with the estimated distortion value.

16 Claims, 4 Drawing Sheets

OPTIMUM PERTURBATION APPARATUS AND METHOD IN A MULTI-ANTENNA MULTI-USER COMMUNICATION SYSTEM

PRIORITY

This application claims priority under 35 U.S.C. §119 to an application filed in the Korean Intellectual Property Office on Jan. 6, 2006 and assigned Serial No. 2006-1579, the contents of which are incorporated herein by reference.

BACKGROUND OF THE INVENTION

1. Field of the Invention

The present invention relates generally to a multi-antenna multi-user communication system, and in particular, to an optimum perturbation apparatus and method.

2. Description of the Related Art

In a wireless communication system where a Base Station (BS) with multiple antennas send data to multiple users simultaneously, channel inversion, regularized inversion, vector perturbation, and regularized perturbation are used for precoding.

The channel inversion scheme, also called zero-forcing precoding, is simplest in that users receive their own data symbols without any coordination among them. The transmitted signal with channel inversion is given by Equation (1), $$x = \frac{\sqrt{P}}{\sqrt{r}} H^H (HH^H)^{-1} u \tag{1}$$

where r is a normalization factor expressed as $\|H^H(HH^H)^{-1}u\|^2$, P is a transmitting power and u is a data vector. r can be increased to infinity due to inversion of a channel response matrix in a poor channel environment. As a consequence, Signal-to-Interference and Noise Ratio (SINR) may become very small.

To overcome the problem of the SINR decrease, the regularized inversion scheme uses $H^H(HH^H+\alpha I)^{-1}$ instead of $H^H(HH^H)^{-1}$ in Equation (1). Thus, the transmitted signal is changed to Equation (2), $$x = \frac{\sqrt{P}}{\sqrt{r}} H^H (HH^H + \alpha I)^{-1} u \tag{2}$$

where $r=\|H^H(HH^H+\alpha I)^{-1}u\|^2$, I is a unitary matrix. SINR can be maximized by selecting an optimum value of $\alpha$ with which r is bounded.

In the vector perturbation scheme, a data vector u is perturbed by an integer-offset vector. Compared to the regularized inversion scheme that maximizes SINR without using a modulo operation at a receiver, the vector perturbation scheme finds an integer vector maximizing SINR and shifts the constellation as much as the integer vector under the assumption of the modulo operation at the receiver. The transmitter sends a signal represented by Equation (3)

$$x = \frac{\sqrt{P}}{\sqrt{r}} H^H (HH^H)^{-1} (u + \tau l) \tag{3}$$

where $r=\|H^H(HH^H)^{-1}(u+\tau l)\|^2$, $\tau$ is a positive real number, and l is a K×1 complex vector. The receiver recovers the received signal by eliminating $\tau l$ by a modulo operation. To maximize the SINR of the received signal, the BS chooses l to minimize r as defined by Equation (4), $$l = \underset{l'}{\operatorname{argmin}} \|H^H(HH^H)^{-1}(u+\tau l')\|^2 \tag{4}$$

This is an integer-lattice least-square problem, which is solved by a sphere encoder.

Finally, the regularized perturbation scheme simply combines the regularized inversion scheme with the vector perturbation scheme. The transmitted signal is defined by Equation (5), $$x = \frac{\sqrt{P}}{r} H^H (HH^H + \alpha I)^{-1} (u + \tau l) \tag{5}$$

where $r=\|H^H(HH^H+\alpha I)^{-1}(u+\tau l)\|^2$. As with the vector perturbation scheme, to maximize the SINR of the received signal, l is chosen to minimize r as reflected by Equation (6) as follows.

$$l = \underset{l'}{\operatorname{argmin}} \|H^H(HH^H + \alpha I)^{-1}(u+\tau l')\|^2 \tag{6}$$

As the vector perturbation scheme is additionally used after the regularized inversion scheme, the regularized perturbation scheme neither maximizes SINR and nor optimizes the parameter $\alpha$ for the regularized inversion scheme. Therefore, interference still remains in the receiver signal after the modulo operation.

SUMMARY OF THE INVENTION

An object of the present invention is to substantially solve at least the above problems and/or disadvantages and to provide at least the advantages below. Accordingly, an object of the present invention is to provide an optimum perturbation apparatus and method in a multi-antenna multi-user communication system.

Another object of the present invention is to provide a novel precoding apparatus and method for maximizing received SINR by effectively combining the regularized inversion scheme with the vector perturbation scheme.

The above objects are achieved by providing an optimum perturbation apparatus and method in a multi-antenna, multi-user communication system.

In an optimum perturbation method for a multi-antenna multi-user communication system according to one aspect of the present invention, upon receipt of modulation symbols, channel responses are decomposed into eigenvalues and eigenvectors by Singular Value Decomposition (SVD) and a distortion value of the modulation symbols is estimated using the eigenvectors and the eigenvalues to minimize noise and interference power. The modulation symbols are precoded by combining the modulation symbols with the estimated distortion value.

According to another aspect of the present invention, in an optimum perturbation apparatus for a multi-antenna multi-user communication system, upon receipt of modulation symbols, a BS decomposes channel responses into eigenvalues and eigenvectors by SVD, estimates a distortion value of the modulation symbols using the eigenvectors and the eigenvalues to minimize noise and interference power, and precodes the modulation symbols by combining the modulation symbols with the estimated distortion value. An MS recovers a received signal by a modulo operation.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides an optimum perturbation apparatus and method in a multi-antenna, multi-user communication system.

Figure 1:
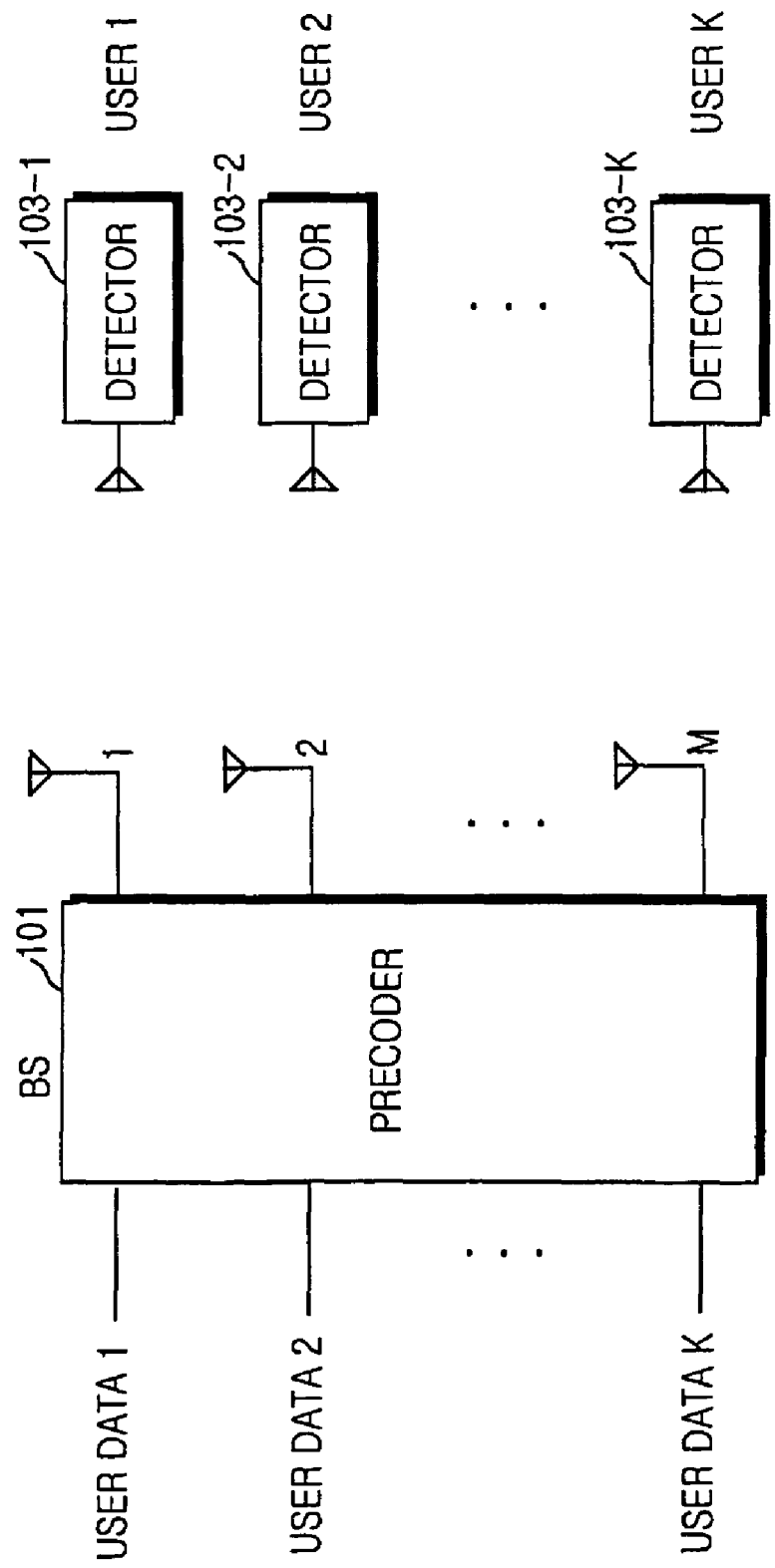
FIG. 1 is a block diagram of an optimum perturbation apparatus in a multi-antenna, multi-user communication system according to the present invention.

Referring to FIG. 1, a BS with M antennas sends different symbols to K users each having one antenna; a precoder 101 in the BS includes a sphere encoder. Precoder 101 precodes K input modulation symbol streams, i.e. K data vectors u by an improved perturbation scheme according to the present invention, and provides the precoded symbol streams x to corresponding antennas. The improved perturbation scheme chooses an integer vector that minimizes noise and interference power and maximizes received SINR and shifts a constellation as much as the integer vector.

The K users recover the transmitted data symbol streams by a modulo operation using detectors 103-1 to 103-K. The modulo operation cancels noise from the received signals.

Figure 2:
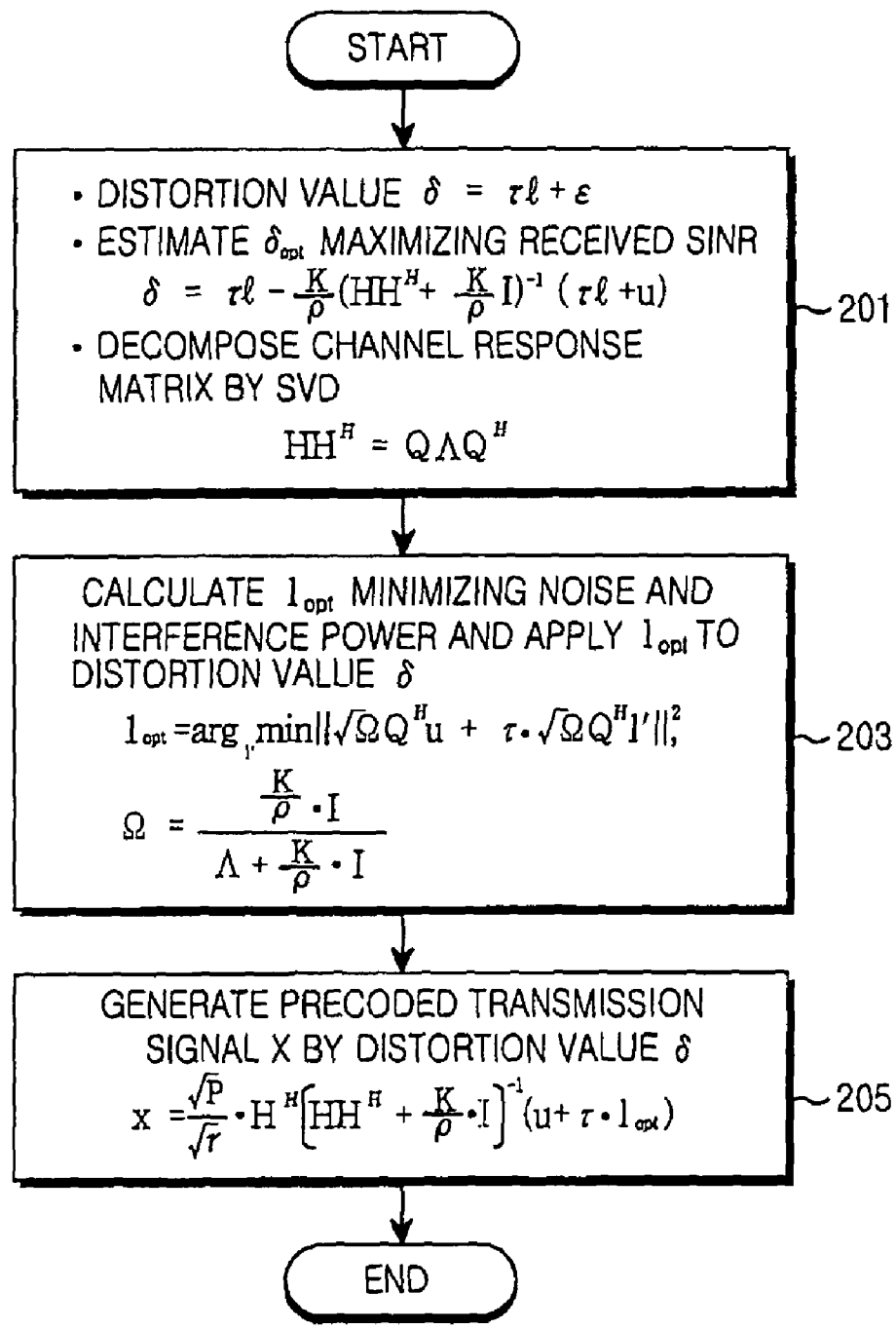
FIG. 2 is a flowchart of an optimum perturbation method in the multi-antenna, multi-user communication system according to the present invention.
Figure 3:
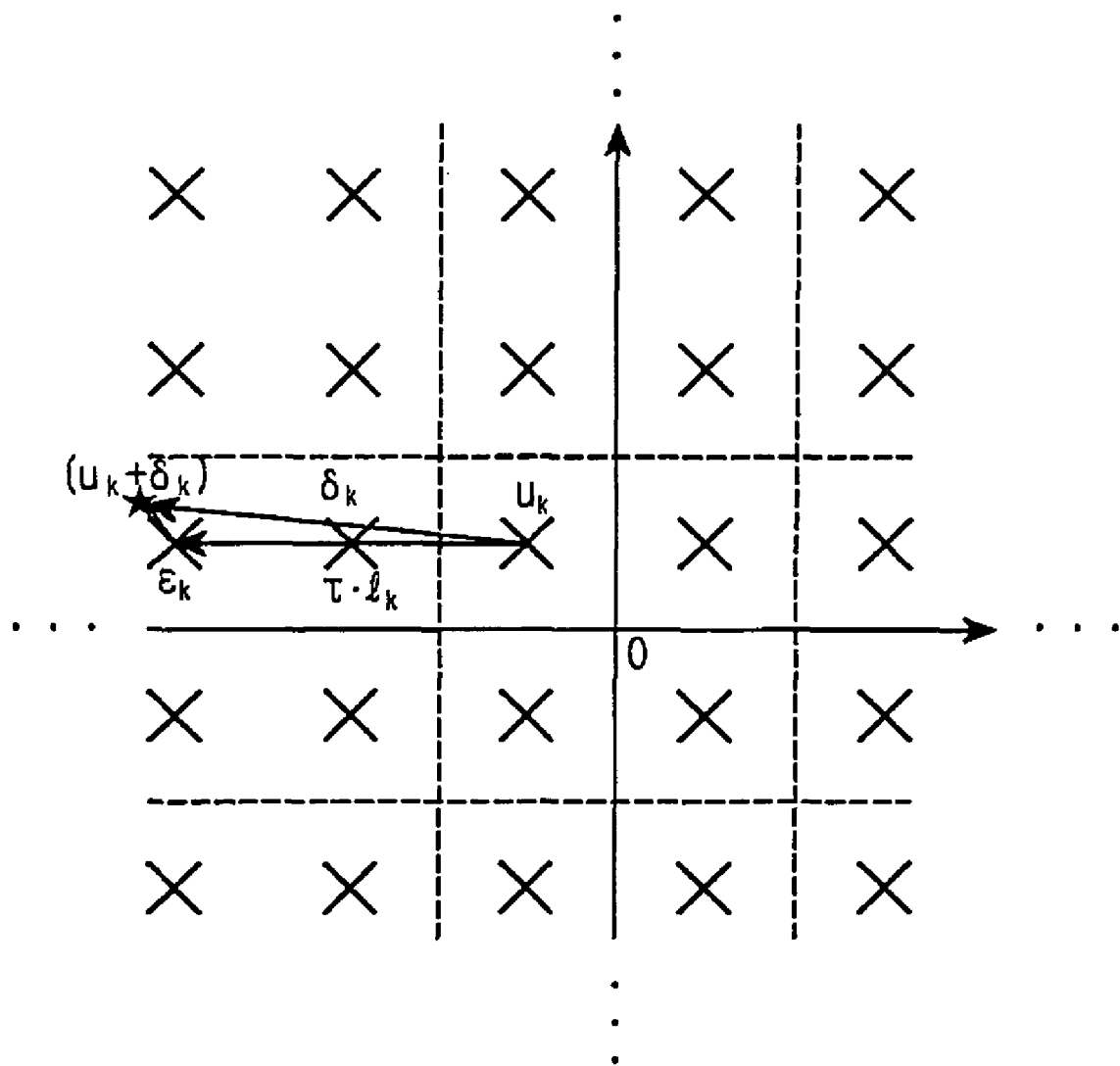
FIG. 3 is a view of the perturbation scheme according to the present invention.

FIG. 2 is a flowchart illustrating an optimum perturbation method in the multi-antenna, multi-user communication system according to the present invention. The perturbation is a precoding scheme that perturbs the data vector u by a distortion value δ, thus reducing the energy of the transmitted signal. Let the perturbed data vector de denoted by ũ as expressed by Equation (7), $$\tilde{u} = u + \delta \quad (7)$$

The perturbed data vector ũ is a shift of δ, i.e. τl+ε from the data vector u, satisfying the conditions that $$\|\mathrm{Re}(\varepsilon)\|_\infty < \frac{\tau}{2} \text{ and } \|\mathrm{Im}(\varepsilon)\|_\infty < \frac{\tau}{2}.$$

The transmitted signal for the perturbed data is defined by Equation (8), $$x = \frac{\sqrt{P}}{\sqrt{r}} H^H (HH^H)^{-1} (u + \delta) \quad (8)$$

$$= \frac{\sqrt{P}}{\sqrt{r}} H^H (HH^H)^{-1} (u + \tau l + \varepsilon)$$

$$= \frac{\sqrt{P}}{\sqrt{r}} H^{-1} (u + \tau l + \varepsilon)$$

where the normalization factor $r = \|H^{-1}(u+\tau l+\epsilon)\|^2$.

Then, the received signal vector at the receiver (i.e. Mobile Station (MS)) is given by Equation (9), $$y = \frac{\sqrt{P}}{\sqrt{r}} u + \frac{\sqrt{P}}{\sqrt{r}} \tau l + \frac{\sqrt{P}}{\sqrt{r}} \varepsilon + n \quad (9)$$

where n is Additive White Gaussian Noise (AWGN). After the modulo operation eliminates $\sqrt{P/r} \cdot \tau$ to recover the received signal, Equation (10) is evaluated as follows, $$y_{mod} = \frac{\sqrt{P}}{\sqrt{r}} u + \frac{\sqrt{P}}{\sqrt{r}} \varepsilon + n \quad (10)$$

ε still remains as an interference signal in the received signal. The SINR of the received signal expressed in Equation (10) is given by Equation (11), $$\Gamma = \frac{\frac{P}{r}\|u\|^2}{\frac{P}{r}\|\varepsilon\|^2 + KN_o} = \frac{\|u\|^2}{\|\varepsilon\|^2 + \frac{KN_o}{P}r} \quad (11)$$

where $N_o$ is a noise variance. Due to the transmission power normalization, as r increases, the received signal may become weak and thus the received SINR may decrease. Hence, the distortion δ is estimated to maximize the received SINR Γ and the data vector u is perturbed by the distortion estimate.

First, δ that maximizes the received SINR, that is, minimizes the denominator function f(δ) of the SINR Γ is calculated using Equation (12), $$f(\delta) = \|\delta - \tau l\|^2 + \frac{KN_o}{P} \|H^{-1}(u + \delta)\|^2 \quad (12)$$

δ that makes the derivative of f(δ) zero is calculated using Equation (13), $$\frac{\partial f(\delta)}{\delta^H} = (\delta - \tau l) + \frac{K}{\rho} H^{-H} H^{-1}(u + \delta) = 0 \quad (13)$$

$$\delta_{local\text{-}min} = \left(I + \frac{K}{\rho} H^{-H} H^{-1}\right)^{-1} \left(\tau l_{local\text{-}min} - \frac{K}{\rho} H^{-H} H^{-1} u\right)$$

Since $\rho=P/N_o$ and $\delta_{local-min}=\tau l_{local-min}+\epsilon_{local-min}$, $$\epsilon_{local-min} = -\frac{K}{\rho}\left(HH^H + \frac{K}{\rho}I\right)^{-1}.$$

Therefore, an optimum $\delta$ is given by Equation (14) as follows.

$$\delta_{opt} = \tau l_{opt} - \frac{K}{\rho}\left(HH^H + \frac{K}{\rho}I\right)^{-1}(u + \tau l_{opt}) \quad (14)$$

Referring to FIG. 2, the BS estimates the distortion value $\delta$ that satisfies $\delta=\tau l+\epsilon$ and maximizes the received SINR according to Equation (14) in step 201. The BS also decomposes the channel response matrix H into eigenvalues and eigenvectors by Singular Value Decomposition (SVD). That is, the Hermitian matrix $HH^H$ being the product of the channel response matrix H and its conjugate-transpose $H^H$ is decomposed by SVD as given by Equation (15), $$HH^H = Q\Lambda Q^H \quad (15)$$

where H is the channel response matrix, Q is a matrix having the eigenvectors of $HH^H$, and $\Lambda$ is a diagonal matrix having the eigenvalues of $HH^H$. The BS can convert a predetermined number of modulation symbols using the eigenvector matrix Q and the eigenvalue matrix $\Lambda$.

In step 203, using Equation (16) the BS calculates $l_{opt}$ that minimizes noise and interference power using the eigenvalues and the eigenvectors and applies $l_{opt}$ to $\delta_{opt}$.

$$l_{opt} = \underset{l'}{\operatorname{argmin}}\left\|\sqrt{\Omega}\,Q^H u + \tau\sqrt{\Omega}\,Q^H l'\right\|^2 \quad (16)$$

where $\Omega = \frac{K/\rho \cdot I}{\Lambda + K/\rho \cdot I}$.

Then the BS precodes the modulation symbols u by combining them with the estimated distortion value $\delta_{opt}$ and sends the precoded symbols, i.e. the transmission signal x in step 205. The transmitted signal x is given by Equation (17), $$x = \frac{\sqrt{P}}{\sqrt{r}}H^{-1}(u+\delta_{opt}) \quad (17)$$
$$= \frac{\sqrt{P}}{\sqrt{r}}H^H\left(HH^H + \frac{K}{\rho}I\right)^{-1}(u+\tau l_{opt})$$

The MS (i.e. the receiver) cancels interference from the received signal by a modulo operation. Then the BS ends the process of the present invention.

Figure 4:
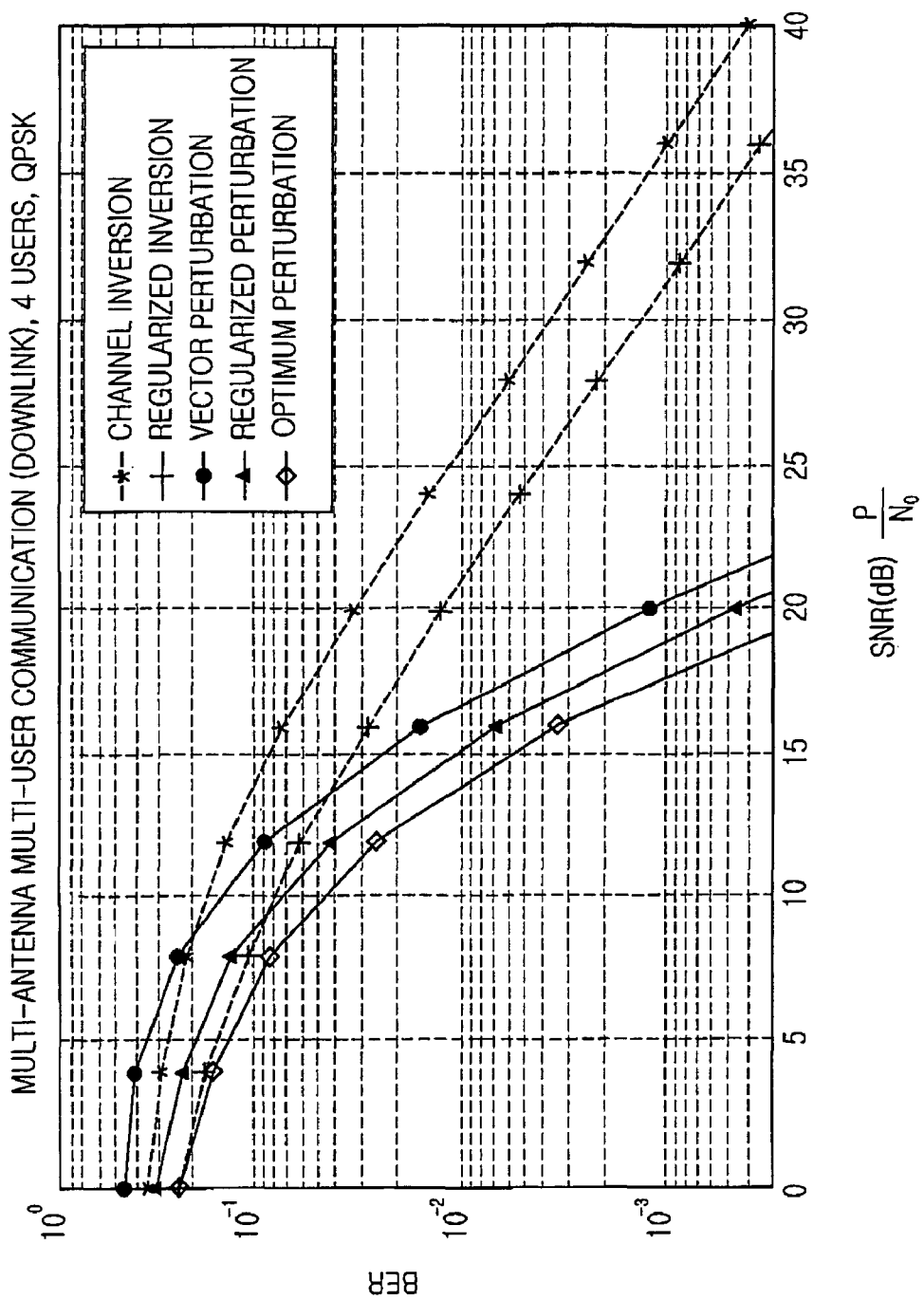
FIG. 4 is a graph comparing conventional precoding methods with the present invention in terms of performance.

FIG. 4 is a graph illustrating results of a simulation comparing conventional precoding methods with the present invention in terms of performance. The simulation was performed for the case where a BS with four antennas sends data to four users on a Quadrature Phase Shift Keying (QPSK). Referring to FIG. 4, the optimum perturbation scheme of the present invention outperforms the regularized perturbation scheme, which performs best among the conventional precoding schemes by a power gain of about 1.5 dB.

As described above, the present invention provides an apparatus and method for sending data by an optimum perturbation scheme combining the regularized inversion scheme with the vector perturbation scheme. Therefore, received SINR is maximized, optimum parameters are easily found, and link level performance is improved with complexity close to those of the conventional schemes.

While the invention has been shown and described with reference to certain preferred embodiments thereof, it will be understood by those skilled in the art that various changes in form and details may be made therein without departing from the spirit and scope of the invention as further defined by the appended claims.

What is claimed is:

1. A perturbation method in a multi-antenna multi-user communication system, comprising the steps of:
   decomposing, upon receipt of modulation symbols, channel responses into eigenvalues and eigenvectors by Singular Value Decomposition (SVD) and estimating a distortion value of the modulation symbols using the eigenvectors and the eigenvalues; and
   precoding the modulation symbols by combining the modulation symbols with the estimated distortion value, wherein the precoded symbols are expressed as $$x = \frac{\sqrt{P}}{\sqrt{r}}H^{-1}(u+\delta_{opt}),$$
$$= \frac{\sqrt{P}}{\sqrt{r}}H^H\left(HH^H + \frac{K}{\rho}I\right)^{-1}(u+\tau l_{opt})$$

where r is a normalization factor, u is a data vector, $\delta$ is the distortion value expressed as $\delta=\tau l+\epsilon$, $\rho=P/N_o$, $\tau$ is a positive real number, and l is a Kx1 complex vector.

2. The perturbation method of claim 1, wherein the distortion value is estimated to maximize received Signal-to-Interference and Noise Ratio (SINR).

3. The perturbation method of claim 1, wherein $l_{opt}$ is represented as $$l_{opt} = \underset{l'}{\operatorname{argmin}}\left\|\sqrt{\Omega}\,Q^H u + \tau\sqrt{\Omega}\,Q^H l'\right\|^2,$$

where $\Omega = \frac{K/\rho \cdot I}{\Lambda + K/\rho \cdot I}$,

H a channel response matrix. Q is a matrix having the eigenvectors of $HH^H$, and $\Lambda$ is a diagonal matrix having the eigenvalues of $HH^H$.

4. The perturbation method of claim 1, wherein $\delta_{opt}$ is represented as $$\delta_{opt} = \tau l_{opt} - \frac{K}{\rho}\left(HH^H + \frac{K}{\rho}I\right)^{-1}(u+\tau l_{opt}).$$

5. The perturbation method of claim 1, wherein the decomposition step comprises decomposing the channel responses into the eigenvalues and the eigenvectors by $$HH^H = Q\Lambda Q^H$$

where H is the channel response matrix, Q is the matrix having the eigenvectors of $HH^H$, and $\Lambda$ is the diagonal matrix having the eigenvalues of $HH^H$.

6. A perturbation apparatus in a multi-antenna, multi-user communication system, comprising:
   a Base Station (BS) for decomposing, upon receipt of modulation symbols, channel responses into eigenvalues and eigenvectors by Singular Value Decomposition (SVD), estimating a distortion value of the modulation symbols using the eigenvectors and the eigenvalues to minimize noise and interference power, and precoding the modulation symbols by combining the modulation symbols with the estimated distortion value; and
   a Mobile Station (MS) for recovering a received signal by a modulo operation, wherein the precoded symbols are expressed as $$x = \frac{\sqrt{P}}{\sqrt{r}} H^{-1}(u + \delta_{opt})$$
$$= \frac{\sqrt{P}}{\sqrt{r}} H^H \left(HH^H + \frac{K}{\rho}I\right)^{-1} (u + \tau l_{opt})$$

where r is a normalization factor, u is a data vector, δ is the distortion value expressed as δ=τl+ϵ, ρ=P/N$_o$, τ is a positive real number, and l is a Kx1 complex vector.

7. The perturbation apparatus of claim 6, wherein $l_{opt}$ is represented as $$l_{opt} = \underset{l'}{\operatorname{argmin}} \left\| \sqrt{\Omega} Q^H u + \tau \sqrt{\Omega} Q^H l' \right\|^2,$$

$$\text{where } \Omega = \frac{K/\rho \cdot I}{\Lambda + K/\rho \cdot I},$$

H a channel response matrix, Q is a matrix having the eigenvectors of HH$^H$, and Λ is a diagonal matrix having the eigenvalues of HH$^H$.

8. The perturbation apparatus of claim 6, wherein $\delta_{opt}$ is represented as $$\delta_{opt} = \tau l_{opt} - \frac{K}{\rho} \left(HH^H + \frac{K}{\rho}I\right)^{-1} (u + \tau l_{opt}),$$

9. The perturbation apparatus of claim 6, wherein the BS estimates the distortion value to maximize received Signal-to-Interference and Noise Ratio (SINR).

10. The perturbation apparatus of claim 6, wherein the BS decomposes the channel responses into the eigenvalues and the eigenvectors by

HH$^H$=QΛQ$^H$ where H is the channel response matrix, Q is the matrix having the eigenvectors of HH$^H$, and Λ is the diagonal matrix having the eigenvalues of HH$^H$.

11. A method in a multi-antenna multi-user communication system, comprising the steps of:
decomposing, upon receipt of symbols, channel responses into eigenvalues and eigenvectors by Singular Value Decomposition (SVD) and estimating a distortion value of the symbols using the eigenvectors and the eigenvalues;
precoding the symbols by combining the symbols with the estimated distortion value;
transmitting the precoded symbols over multi-antennas;
receiving the transmitted symbols via multi-antennas; and
recovering the received symbols by a modulo operation,
wherein the precoded symbols are expressed as $$x = \frac{\sqrt{P}}{\sqrt{r}} H^{-1}(u + \delta_{opt})$$
$$= \frac{\sqrt{P}}{\sqrt{r}} H^H \left(HH^H + \frac{K}{\rho}I\right)^{-1} (u + \tau l_{opt})$$

where r is a normalization factor, u is a data vector, δ is the distortion value expressed as δ=τl+ϵ, ρ=P/N$_o$, τ is a positive real number, and l is a Kx1 complex vector.

12. The method of claim 11, wherein $l_{opt}$ is represented as $$l_{opt} = \underset{l'}{\operatorname{argmin}} \left\| \sqrt{\Omega} Q^H u + \tau \sqrt{\Omega} Q^H l' \right\|^2,$$

$$\text{where } \Omega = \frac{K/\rho \cdot I}{\Lambda + K/\rho \cdot I},$$

H a channel response matrix, Q is a matrix having the eigenvectors of HH$^H$, and Λ is a diagonal matrix having the eigenvalues of HH$^H$.

13. The method of claim 11, wherein $\delta_{opt}$ is represented as $$\delta_{opt} = \tau l_{opt} - \frac{K}{\rho} \left(HH^H + \frac{K}{\rho}I\right)^{-1} (u + \tau l_{opt}).$$

14. The method of claim 11, wherein the decomposition step comprises decomposing the channel responses into the eigenvalues and the eigenvectors by

HH$^H$=QΛQ$^H$ where H is the channel response matrix, Q is the matrix having the eigenvectors of HH$^H$, and Λ is the diagonal matrix having the eigenvalues of HH$^H$.

15. A transmitter in a multi-antenna, multi-user communication system, comprising:
means for decomposing, upon receipt of modulation symbols, channel responses into eigenvalues and eigenvectors by Singular Value Decomposition (SVD), estimating a distortion value of the modulation symbols using the eigenvectors and the eigenvalues; and
means for precoding the modulation symbols by combining the modulation symbols with the estimated distortion value,
wherein the precoded symbols are expressed as $$x = \frac{\sqrt{P}}{\sqrt{r}} H^{-1}(u + \delta_{opt})$$
$$= \frac{\sqrt{P}}{\sqrt{r}} H^H \left(HH^H + \frac{K}{\rho}I\right)^{-1} (u + \tau l_{opt})$$

where r is a normalization factor, u is a data vector, δ is the distortion value expressed as δ=τl+ϵ, ρ=P/N$_o$, τ is a positive real number, and l is a Kx1 complex vector.

16. The transmitter of claim 15, wherein $l_{op}$ is represented as $$l_{opt} = \underset{l'}{\operatorname{argmin}} \left\| \sqrt{\Omega} Q^H u + \tau \sqrt{\Omega} Q^H l' \right\|^2,$$

$$\text{where } \Omega = \frac{K/\rho \cdot I}{\Lambda + K/\rho \cdot I},$$

H a channel response matrix, Q is a matrix having the eigenvectors of HH$^H$, and Λ is a diagonal matrix having the eigenvalues of HH$^H$.

* * * * *